H. Beagle. Jr,

Nut Lock.

No. 103,544.  Patented May 31, 1870.

Witnesses:
A. W. Almqvist
L. S. Maber

Inventor:
H. Beagle. Jr.
per Munn
Attorneys.

UNITED STATES PATENT OFFICE.

HENRY BEAGLE, JR., OF PHILADELPHIA, PENNSYLVANIA.

IMPROVEMENT IN NUT-LOCK.

Specification forming part of Letters Patent No. 103,544, dated May 31, 1870.

*To all whom it may concern:*

Be it known that I, HENRY BEAGLE, Jr., of Philadelphia, in the county of Philadelphia and State of Pennsylvania, have invented a new and useful Improvement in Nut-Lock; and I do hereby declare that the following is a full, clear, and exact description thereof, which will enable others skilled in the art to make and use the same, reference being had to the accompanying drawing, forming part of this specification.

Figure 1:
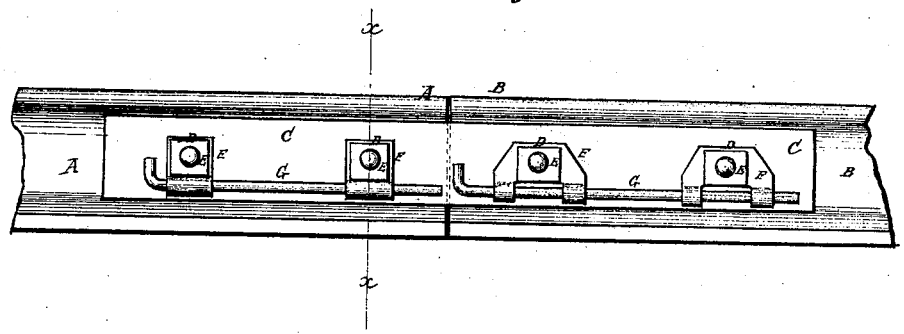
Figure 2:
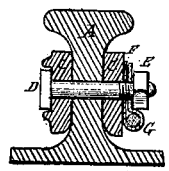

Figure 1 is a side view of the adjacent ends of two railroad-rails to which my improved nut-lock has been attached. Fig. 2 is a cross-section of the same, taken through the line $x$ $x$, Fig. 1.

Similar letters of reference indicate corresponding parts.

My invention has for its object to furnish an improved nut-lock, designed more especially for locking the nuts of fish-plate bolts, but equally applicable for use in other places where the bolts and nuts are exposed to a continual jarring; and it consists in the nut-lock constructed as hereinafter more fully described.

A and B represent the adjacent ends of two railroad-rails, which are connected to each other by the fish-plates C, bolts D, and nuts E, in the ordinary manner.

F are washers, which are placed upon the forward ends of the bolts D, between the fish-plates C and nuts E, and which are made considerably wider than the said nuts E.

Upon the lower edge of the washers F are formed eyes, the middle parts of which are cut away to allow the corners of the nuts E to pass freely while the said nuts are being screwed upon and unscrewed from the bolts D.

Through the eyes of two or more of the washers F are passed the rods or wires G, one end of which is bent out at right angles to serve as a handle in inserting and withdrawing the said rods.

If desired, after the rods G have been inserted in place, their forward ends may be slightly bent, to prevent the possibility of their working out; but this will scarcely ever be found necessary.

If desired, the washers F may be made narrow, so as to be of about the same breadth as the nuts E. In this case the middle parts of the eyes of said washers must not be cut away, and the washers must be turned by and with the nuts E as they are screwed on and off.

The washers F may be made of a double thickness of sheet metal, the eyes being formed by bending the washers together, as shown in Fig. 2; or the said washers may be formed of a single thickness of sheet metal, the eyes being formed by bending one edge of the washers back upon itself.

I have described the nut-lock as applied to railroad-rails; but it is equally applicable wherever two bolts are placed in line.

In some cases it may be advisable to make the rods G U-shaped and adjust the washers so that their eyes may be toward each other, so that one arm of the U-shaped rod may pass through the eye of the one washer and the other arm through the eye of the other washer, the rods G thus locking the nuts from turning.

The device F G may be used for locking the nut of a single bolt by inserting a pin in the object through which the bolt passes, in such a position that the edge of the washer F and the rod G may both strike against it, while the nut may be turned freely when the rod G is withdrawn without touching the said pin.

Having thus described my invention, I claim as new and desire to secure by Letters Patent—

An improved nut-lock, F G, constructed and operating substantially as herein shown and described, and for the purpose set forth.

HENRY BEAGLE, JR.

Witnesses:
THOMAS S. BEAGLE,
PETER HAY.